US010080179B2

(12) United States Patent
Huang et al.

(10) Patent No.: US 10,080,179 B2
(45) Date of Patent: Sep. 18, 2018

(54) METHOD FOR VERIFYING OPERATION IN WIRELESS CONTROL SYSTEM

(71) Applicant: GRAND MATE CO., LTD., Taichung (TW)

(72) Inventors: Chung-Chin Huang, Taichung (TW);
Chin-Ying Huang, Taichung (TW);
Hsin-Ming Huang, Taichung (TW);
Hsing-Hsiung Huang, Taichung (TW);
Yen-Jen Yeh, Taichung (TW);
Chin-Huang Chang, Yunlin County (TW)

(73) Assignee: GRAND MATE CO., LTD., Taichung (TW)

( * ) Notice: Subject to any disclaimer, the term of this patent is extended or adjusted under 35 U.S.C. 154(b) by 38 days.

(21) Appl. No.: 15/294,970

(22) Filed: Oct. 17, 2016

(65) Prior Publication Data

US 2017/0230892 A1 Aug. 10, 2017

(30) Foreign Application Priority Data

Feb. 4, 2016 (TW) .............................. 105103713 A

(51) Int. Cl.
*H04W 40/22* (2009.01)
*H04L 12/28* (2006.01)
*H04W 12/08* (2009.01)

(52) U.S. Cl.
CPC ......... *H04W 40/22* (2013.01); *H04L 12/2803* (2013.01); *H04W 12/08* (2013.01)

(58) Field of Classification Search
CPC ............. H04L 65/1069; H04L 12/2818; H04L 12/2803; H04L 12/2814; H04L 12/281;
(Continued)

(56) References Cited

U.S. PATENT DOCUMENTS

2005/0184852 A1* 8/2005 Lee ........................ G05B 15/02
340/3.1
2013/0300564 A1* 11/2013 Lamb ................... G08B 25/008
340/573.4
(Continued)

FOREIGN PATENT DOCUMENTS

CN 1682491 A 10/2005
CN 203909594 U 10/2014
(Continued)

OTHER PUBLICATIONS

Examination report for TW105103713, dated Nov. 16, 2017, Total of 11 pages.
(Continued)

*Primary Examiner* — Peter Chen
(74) *Attorney, Agent, or Firm* — Lynette Wylie; Apex Juris, pllc.

(57) ABSTRACT

A method for verifying an operation in a wireless remote control system is disclosed, comprising the following steps: receive a control command with a server, and store the control command in the server; upon receiving an inquiry command from a relay device, the control command is sent to the relay device, and then sent to a home appliance to operate the home appliance accordingly; a state information is generated by the home appliance after performing the operation, and is sent to the server by the relay device; determine whether the server receives the state information; if so, a corresponding relation between the state information and the control command is established in the server; otherwise, the relay device is required to return the state information again, until the server does receive the state information. Whereby, the operation of the home appliance could be verified.

16 Claims, 3 Drawing Sheets

(58) Field of Classification Search
CPC ............. H04L 12/282; H04L 12/2825; H04L 12/2809; H04L 12/2834; H04L 12/4633; H04L 12/2807; H04L 12/2823; H04L 2012/285; H04L 41/06; H04L 41/0681; H04L 41/0816; H04L 43/0811; H04W 84/18; H04W 28/021; H04W 88/04; H04W 40/22
See application file for complete search history.

(56) References Cited

U.S. PATENT DOCUMENTS

| | | | | |
|---|---|---|---|---|
| 2015/0066169 A1* | 3/2015 | Nakano | ............... | G05B 15/02 |
| | | | | 700/90 |
| 2015/0134727 A1* | 5/2015 | Lee | ................... | H04L 67/025 |
| | | | | 709/203 |

FOREIGN PATENT DOCUMENTS

| | | | |
|---|---|---|---|
| CN | 104157115 A | 11/2014 | |
| TW | 201532456 A | 8/2015 | |

OTHER PUBLICATIONS

Search report for TW105103713, dated Nov. 14, 2017, Total of 1 page.
English abstract for CN1682491, Total of 1 page.
English abstract for CN104157115, Total of 1 page.
English abstract for CN203909594, Total of 1 page.
English abstract for TW201532456, Total of 1 page.

* cited by examiner

METHOD FOR VERIFYING OPERATION IN WIRELESS CONTROL SYSTEM

BACKGROUND OF THE INVENTION

1. Technical Field

The present invention relates generally to a system for controlling home appliances, and more particular to a method for verifying an operation in a wireless control system.

2. Description of Related Art

A remote control is a commonly seen component in present days to operate a home appliance wirelessly from a short distance. Typically, one remote control is matched with one home appliance in a one-to-one relation, which means that each home appliance has a specific remote control to control it. Therefore, with more home appliances in a home, there would be more remote controls to be placed. Furthermore, home appliances of the same type usually have similar looking remote controls, which may confuse the user.

In light of this, a remote control system having a relay device is developed, which allows the user to access the system with an electronic device such as a computer or a mobile phone through a network. Within such a remote control system, the user could input a command on an electronic device, and this command would be then transmitted to the relay device. Upon receiving the command, the relay device would convert it into a control signal, and transmit the control signal to a specific home appliance. In this way, the user is able to control various home appliances with one single electronic device as a remote control.

A server is required while transmitting such a command from an electronic device to a relay device through a network. However, after the server sends out the control signal, whether a corresponding operation of the home appliance is exactly performed might be unknown for the user. In all aspects, how to verify the operation of a home appliance in this type of remote control system has become a major issue in the industry.

BRIEF SUMMARY OF THE INVENTION

In view of the above, the primary objective of the present invention is to provide a method for verifying an operation in a wireless remote control system, which may verify the operation of a home appliance corresponding to a control command is indeed performed.

The present invention provides a method for verifying an operation in a wireless remote control system, wherein the wireless control system comprises a server, a relay device, and at least one home appliance. The server is connected to the relay device through a network. The relay device is wirelessly connected to the at least one home appliance. The method comprising the steps of:

A. Receiving at least one control command with the server, and saving the at least one control command in the server;

B. Generating an inquiry command by the relay device, and sending the inquiry command to the server;

C. Sending the at least one control command stored in the server to the relay device according to the inquiry command;

D. Sending the at least one control command from the relay device to the at least one home appliance to operate the at least one home appliance accordingly, and generating a corresponding state information by the at least one home appliance after performing a corresponding operation;

E. Sending the state information from the at least one home appliance to the relay device;

F. sending the state information from the relay device to the server;

G. determining whether the server receives the state information;

If so, establishing a corresponding relation between the state information and the at least one control command in the server;

Otherwise, repeating step F and step G.

Therefore, by sending the control command to the relay device and the home appliance by the server, receiving the state information from the home appliance, and establishing the corresponding relation between the state information and the control command, the operation of the home appliance could be verified whether to be performed or not.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
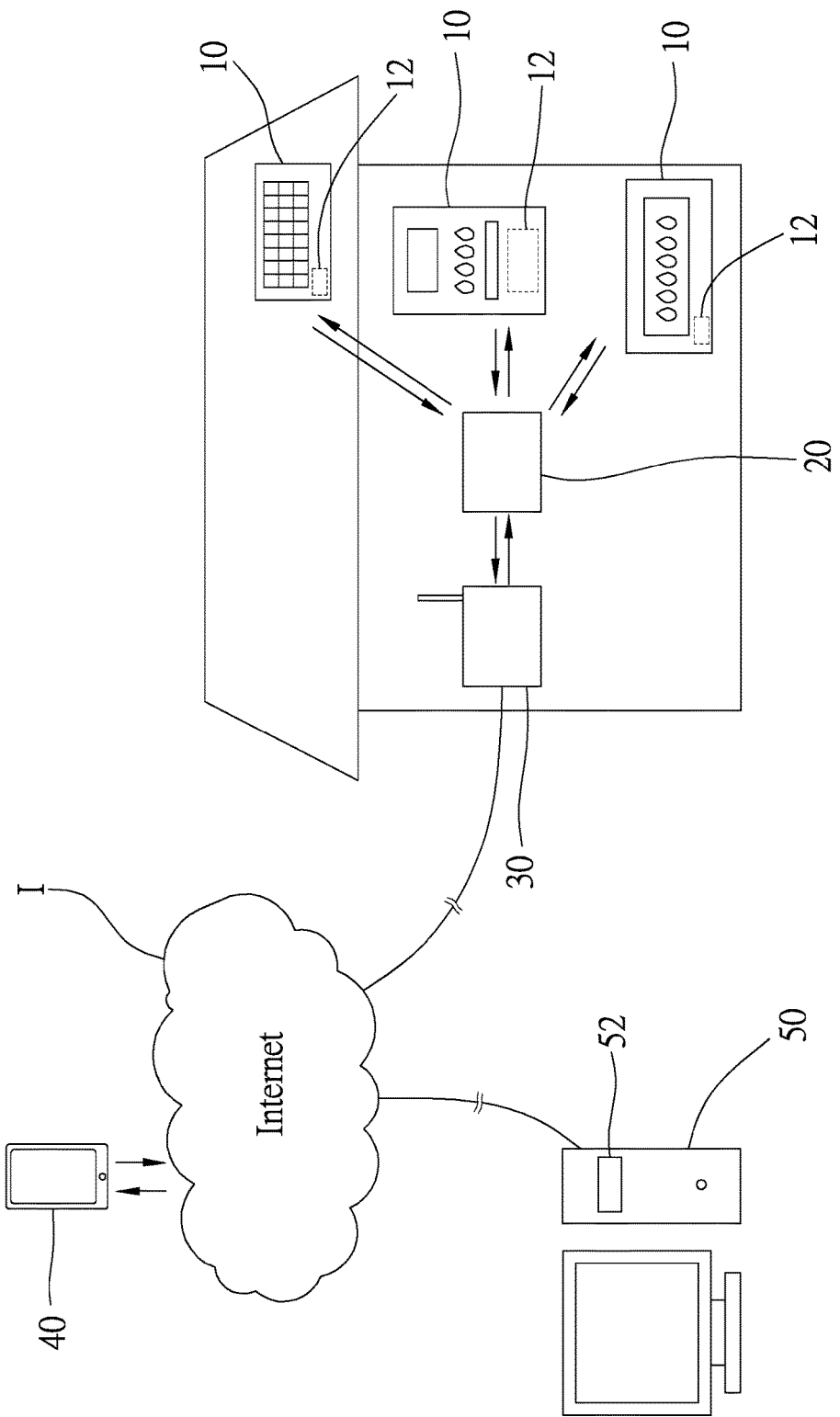
FIG. 1 is a schematic diagram of the remote control system of an embodiment of the present invention.

FIG. 1 shows a wireless control system applied with a method for verifying an operation in the wireless control system of an embodiment of the present invention, wherein the wireless control system includes a plurality of home appliances 10, a relay device 20, an access point 30, an electronic device, which is a tablet 40 as an example, and a server 50.

Figure 2:
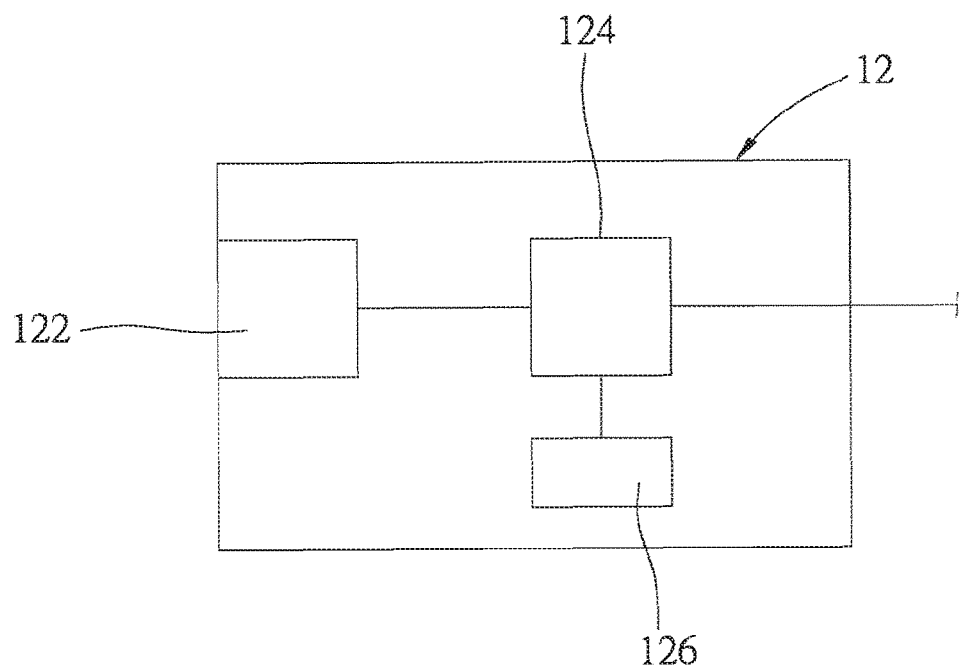
FIG. 2 is a block diagram of the control unit of the embodiment of the present invention.

In the embodiment, the home appliances 10 are home appliances installed at a user terminal, including an air condition, a fireplace, and a water heater. Each home appliance 10 includes a control unit 12. As shown in FIG. 2, the control unit 12 has an RF transceiver 122, a control circuit 124, and a memory 126. The RF transceiver 122 is adapted to transmit and receive radio frequency (RF) signals. The control circuit 124 is electrically connected to the RF transceiver 122 to receive RF signals sent from the RF transceiver 122. Furthermore, the control circuit 124 would retrieve commands in the received RF signals to control the home appliances 10 accordingly, whereby the home appliances 10 could perform operations such as turning on/off and adjusting the temperature. The control circuit 124 would further compile and encapsulate a state information of each of the home appliances 10 into an RF signal, which would be then transmitted to the relay device 20 through the RF transceiver 122. The state information may include a status of being on/off, a current temperature, an error code, etc. A plurality of appliance codes are stored in the memory 126, wherein each of the appliance codes corresponds to one of the home appliances 10. In the embodiment, each of the appliance codes contains a model and a series number of the corresponding home appliance 10, wherein the model and the series number of each of the home appliances 10 are provided by the manufacturer, and are all different from each other. In other words, each of the appliance codes is unique. While compiling and encapsulating the state information of each of the home appliances 10, the control circuit 124 would also incorporate the corresponding appliance code in, which could be used for identification.

Figure 3:
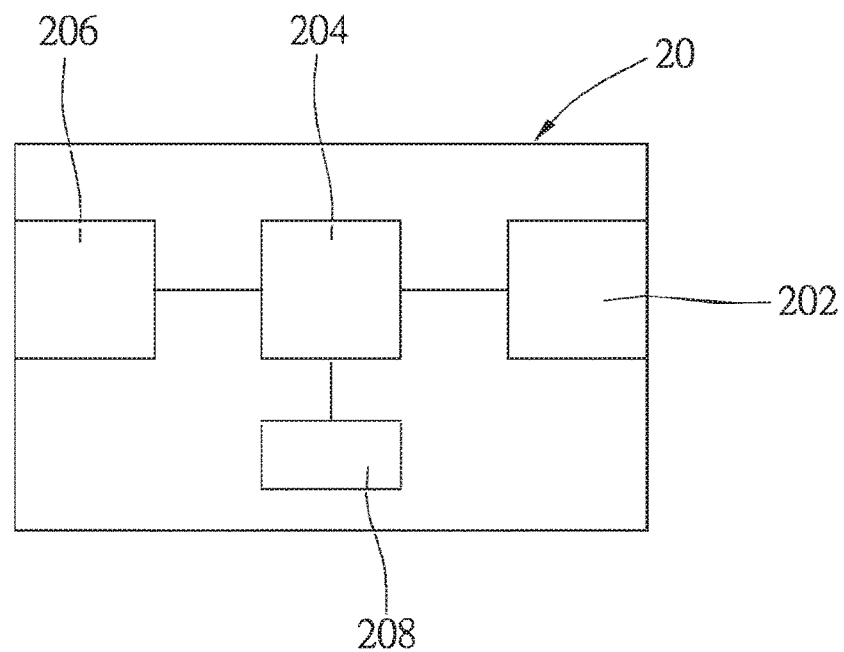
FIG. 3 is a block diagram of the relay device of the embodiment of the present invention.

As shown in FIG. 3, the relay device 20 is located in the user terminal, and includes a RF transceiver 202, a converter 204, a Wi-Fi transceiver 206, and a memory 208, which is electrically connected to the converter 204, wherein the RF transceiver 202, the converter 204, the Wi-Fi transceiver 206 are sequentially and electrically connected together. The RF transceiver 202 is adapted to receive the RF signals sent from the RF transceiver 122 of each of the home appliances 10. The converter 204 could receive the RF signal sent from the RF transceiver 202, retrieve the data contained in the received RF signal, and encapsulated it into a corresponding Wi-Fi signal, which would then be sent out through the Wi-Fi transceiver 206. On the other hand, upon receiving a Wi-Fi signal, the Wi-Fi transceiver 206 would transmit the received Wi-Fi signal to the converter 204, where the data contained in the Wi-Fi signal would be retrieved, and then encapsulated into a corresponding RF signal, which would then be sent out through the RF transceiver 202.

The Wi-Fi transceiver 206 has a MAC address, and the converter 204 would retrieve the MAC address and store it in the memory 208. The MAC address is referred as a relay device code to exclusively represent the relay device 20. With the MAC address as the relay device code, the relay device 20 could be distinguishable from other relay devices, if there are any. In practice, a series number designated by the manufacturer could be also stored in the memory 208 to be used as the relay device code. In addition, codes sent from the home appliances 10 and the state information of the home appliances 10 would be also stored in the memory 208.

The access point 30 is connected to the server 50 through a network, which is an Internet I, and is connected to the relay device 20 through Wi-Fi protocols.

The tablet 40 is connected to the server 50 through the Internet I, wherein the tablet 40 has a built-in application, which is adapted for a user to input at least one control command (e.g. power on/off, adjusting temperature, etc.) of the home appliances 10. The relay device code of the relay device 20 and the appliance codes of the home appliances 10 are also stored in the tablet 40. The home appliances 10 could be controlled by the application of the tablet 40. The inputted at least one control command could be transmitted to the server 50 through the Internet I, wherein the at least one control command transmitted by the tablet 40 includes the relay device code of the relay device 20, at least one of the appliance codes of the home appliances 10, and at least one command code of the to-be-controlled home appliance 10. For example, powering on or off, adjusting temperature, and other operations all have a corresponding command code).

The server 50 has a database 52 to store the at least one control command transmitted by the tablet 40, wherein each control command has a corresponding state field in the database 52 to verify a corresponding relation between an operation of the to-be-controlled home appliance 10 and the control command. The relay device 20 communicates with the server 50 through the access point 30. The relay device 20 would create an inquiry command at regular intervals and transmit the inquiry command to the server 50, wherein the inquiry command includes the relay device code of the relay device 20.

With the aforementioned structures, the method of the present invention could be applied, wherein the method includes the following steps.

The at least one control command is inputted through the electronic device 40 (e.g. to control one of the home appliances 10 to power on), the at least one control command includes the relay device code of the relay device 20, the appliance codes of the corresponding home appliances 10, and a command code (e.g. which corresponds to powering on). The at least one control command would be transmitted to the server 50 by the tablet 40.

When the server 50 receives the at least one control command, the at least one control command would be stored in the database 52 of the server 50, and a state field corresponding to the received control command would be created in the database 52 by the server 50.

Once the relay device 20 creates the inquiry command, the inquiry command would be transmitted to the server 50 to inquire whether the server 50 has received the control command corresponding to the relay device 20.

The at least one control command in the database 52 would be compared with the relay device code in the inquiry command, when the relay device code corresponds to the at least one control command of the database 52, the at least one control command would be transmitted to the relay device 20 through the Internet I and the access point 30.

Figure 4:
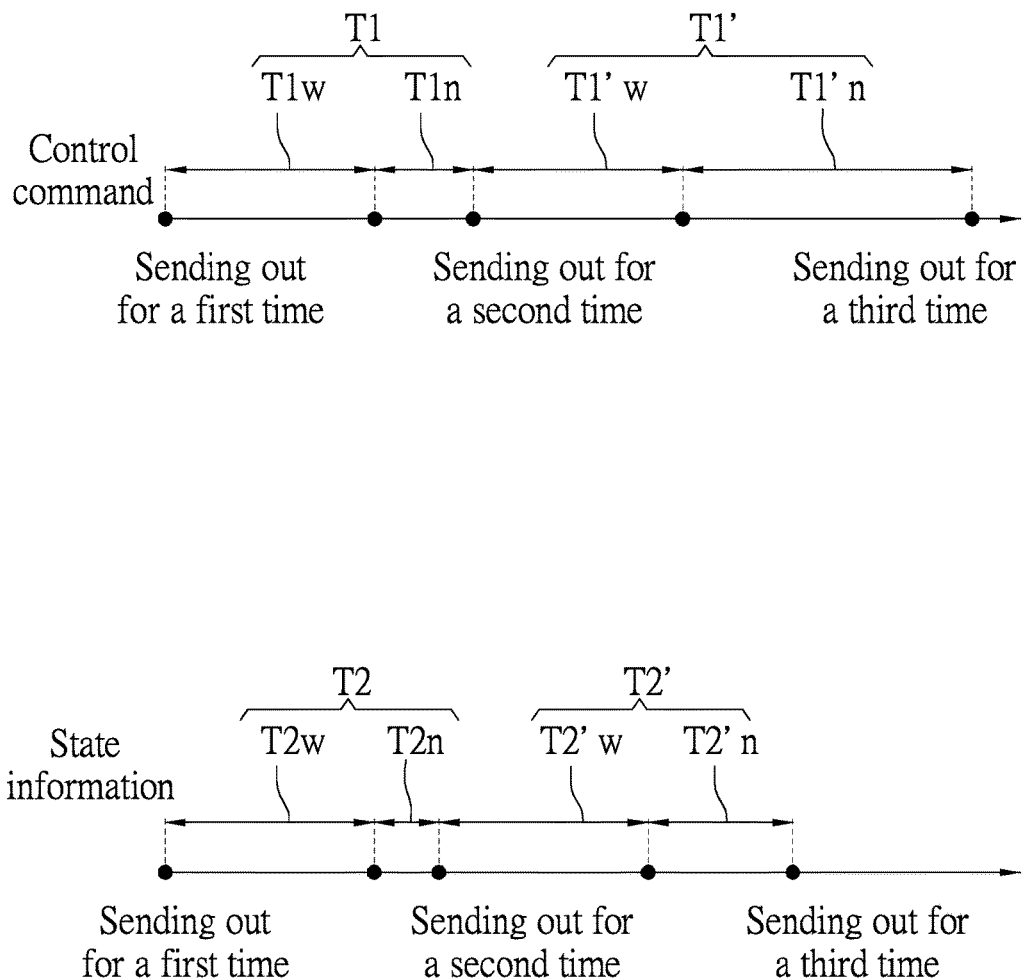
FIG. 4 is a schematic diagram, showing the transmission of the control command and the state information.

When the Wi-Fi transceiver 206 of the relay device 20 receives a Wi-Fi signal which has the at least one control command, the converter 204 retrieves the at least one control command, and encapsulates the at least one control command into a corresponding RF signal to be sent out through the RF transceiver 202. As shown in FIG. 4, in the embodiment, the at least one control command would be transmitted to the home appliances 10 from the relay device 20 for three times by the converter 204. A first interval T1 is defined as the time interval between the time points when the control command is sent out for a first time and for a second time. Another first interval T1' is defined as the time interval between the time points when the control command is sent out for at the second time and for a third time. The first intervals T1, T1' are randomly decided by the converter 204 to prevent a conflict between the state information transmitted from the home appliances 10 and the control commands sent from the relay device 20, which may cause the home appliances 10 to miss the control commands. Each of the first intervals T1, T1' respectively includes a first waiting time T1$w$, T1'$w$ and a first random time T1$n$, T1'$n$, wherein each of the first waiting times T1$w$, T1'$w$ is a reaction time for the RF transceiver 202 to ensure the previous control command is already sent. The first waiting time T1$w$, T1'$w$ respectively included in each of the first intervals T1, T1' is always the same in every round, while the first random time T1$n$, T1'$n$ respectively included in each of the first intervals T1, T1' is randomly decided.

When the control circuit 124 of the control unit 12 of the home appliances 10 receives the at least one control command, the at least one control command would be decoded. If the appliance code in the at least one control command accords with the appliance code of one of the home appliances 10, this home appliance 10 would perform a corresponding operation according to the command code, and would create the corresponding state information after performing the operation (e.g. powering on). For each of the home appliances 10, if the appliance code in the at least one control command does not accord with the appliance code of the home appliances 10, the home appliances 10 would simply ignore the received control command.

Then, the operating home appliance 10 would send the state information to the relay device 20. As shown in FIG. 4, in the embodiment, the state information would be transmitted to the relay device 20 from the home appliance 10 for three times by the control circuit 124. A second interval T2 is defined as the time interval between the time points when the state information is sent out for a first time and for a second time. Another second interval T2' is defined as the time interval between the time points when the state information is sent out for the second time and for a third time. The second intervals T2, T2' are randomly decided by the control circuit 124 to be respectively different from the first interval T1, T1' to prevent a conflict between the control command sent from the relay device 20 and the state information sent by the operating home appliance 10, which may cause the relay device 20 to miss the state information. Each of the second intervals T2, T2' includes a second waiting time T2w, T2'w and a second random time T2n, T2'n, wherein the second waiting time T2w, T2'w is a reaction time for the RF transceiver 122 to ensure the previous state information is already sent by the RF transceiver 122. The second waiting time T2w, T2'w respectively included in each of the second intervals T2, T2' is always the same, while the second random time T2n, T2'n respectively included in each of the second intervals T2, T2' is randomly decided. Therefore, even if the control command sent out for the first time and the state information sent out for the first time are both sent out at the same time, a time point when the control command is sent out for the second time would be different from a time point when the state information is sent out for the second time, which could prevent the conflict between the control command and the state information, for the first intervals T1,T1' and the second intervals T2, T2' are randomly decided to be different.

In other embodiments, the control command and the state information could be transmitted for one, two, or more than three times. Transmitting the control command and the state information for at least two times could prevent the conflict between the control command and the state information. In practice, when the at least one control command corresponds to many home appliances 10, the randomly decided second intervals T2, T2' could prevent a conflict between each state information generated by each corresponding home appliance 10, therefore the relay device 20 would not miss the state information.

When the relay device 20 receives the state information, the state information would be stored in the memory 208, until the relay device 20 generates another inquiry command. The received and stored state information and the another inquiry command would be sent to the server 50 through the access point 30 and the Internet I. In addition, when the server 50 receives another control command from the tablet 40 during the aforementioned steps, the server 50 could store the another control command in the database 52.

When the server 50 receives the another inquiry command, the server 50 would determine whether the another control command is stored in the database 52. If so, the stored another control command would be sent to the relay device 20, and then sent to the home appliances 10 from the relay device 20 to operate the corresponding home appliance 10. If the database 52 does not have the another control command, the server 50 would reply to the relay device 20 that the server 50 does not receive the another control command at this time.

The server 50 would determine whether the server 50 receives the state information corresponding to the control command.

If the server 50 receives the state information corresponding to the control command, the received state information would be written to the corresponding state field to establish the corresponding relation between the control command and the state information, which could be used to verify an operation of the home appliances 10, and the state information would be sent to the tablet 40 to update a condition of the corresponding home appliance 10 through the application thereof.

If the server 50 does not receive the state information, the server 50 would generate a nonresponsive command, and send the nonresponsive command to the relay device 20 upon receiving a next inquiry command from the relay device 20. When the relay device 20 receives the nonresponsive command, the state information would be repeatedly sent to the server 50, and the server 50 would determine whether the server 50 receives the state information until the server 50 does receive the state information.

In summary, the method of the present invention could effectively verify the operation in the wireless control system by sending the control command from the server 50 to the home appliances 10 and the relay device 20 at the user terminal, and establishing the corresponding relation between the control command and the state information when the state information is sent to the server 50.

It must be pointed out that the embodiments described above are only some preferred embodiments of the present invention. All equivalent methods which employ the concepts disclosed in this specification and the appended claims should fall within the scope of the present invention.

What is claimed is:

1. A method for verifying an operation in a wireless remote control system, wherein the wireless remote control system comprises a server, a relay device, and at least one home appliance; the server is connected to the relay device through a network; the relay device is wirelessly connected to the at least one home appliance; the method comprising the steps of:
   A. receiving at least one control command with the server from an electronic device inputted by a user, and saving the at least one control command in the server;
   B. generating an inquiry command by the relay device, and sending the inquiry command to the server, wherein the inquiry command is to inquire whether the server has received the at least one control command corresponding to the relay device;
   C. sending the at least one control command stored in the server to the relay device according to the inquiry command when the server determines that the at least one control command corresponding to the relay device has been received;
   D. sending the at least one control command from the relay device to the at least one home appliance to operate the at least one home appliance accordingly, and generating a corresponding state information by the at least one home appliance after performing a corresponding operation;
   E. sending the state information from the at least one home appliance to the relay device;
   F. sending the state information from the relay device to the server;
   G. determining whether the server receives the state information;

if so, establishing a corresponding relation between the state information and the at least one control command in the server;

otherwise, repeating step F and step G.

2. The method of claim 1, wherein, in step G, if the server does not receive the state information, the server generates a nonresponsive command, and sends the nonresponsive command to the relay device; once the relay device receives the nonresponsive command, step F and step G are repeated.

3. The method of claim 1, wherein step A further comprises creating a state field, which corresponds to the at least one control command; in step G, once the server receives the state information, the state information is incorporated into the corresponding state field to establish the corresponding relation between the at least one control command and the state information.

4. The method of claim 1, wherein, in step D, the at least one control command is transmitted from the relay device to the at least one home appliance for at least two times; a first interval is defined as a time interval between time points when the at least one control command is sent out for a first time and for a second time; in step E, the state information is transmitted from the at least one home appliance to the relay device; a second interval is defined as a time interval between time points when the state information is sent out for a first time and for a second time; the second interval is different from the first interval.

5. The method of claim 4, wherein, in step D, the first interval is randomly decided.

6. The method of claim 5, wherein, in step D, the first interval comprises a first waiting time and a first random time; the first random time is randomly decided.

7. The method of claim 4, wherein, in step E, the second interval is randomly decided.

8. The method of claim 7, wherein, in step E, the second interval comprises a second waiting time and a second random time; the second random time is randomly decided.

9. The method of claim 7, wherein the at least one home appliance comprises a plurality of home appliances; in step A, the at least one control command corresponds to more than one of the home appliances; in step D, the at least one control command is sent to the corresponding home appliances; each of said home appliances generates the corresponding state information after performing the corresponding operation; in step E, the state information is transmitted from each of said corresponding home appliances to the relay device for at least two times.

10. The method of claim 1, wherein step F further comprises generating another inquiry command, and sending the another inquiry command to the server; after step F, the method further comprises determining whether another control command is stored in the server; if so, the another control command is sent from the server to the relay device according to the another inquiry command, and then sent to the at least one home appliance to operate the corresponding home appliance.

11. A method for verifying an operation in a wireless remote control system, wherein the wireless remote control system comprises a server, a relay device, and at least one home appliance; the server is connected to the relay device through a network; the relay device is wirelessly connected to the at least one home appliance; the method comprising the steps of:

A. receiving at least one control command with the server from an electronic device inputted by a user, and saving the at least one control command in the server;

B. generating an inquiry command by the relay device, and sending the inquiry command to the server;

C. sending the at least one control command stored in the server to the relay device according to the inquiry command;

D. sending the at least one control command from the relay device to the at least one home appliance to operate the at least one home appliance accordingly, and generating a corresponding state information by the at least one home appliance after performing a corresponding operation;

E. sending the state information from the at least one home appliance to the relay device;

F. sending the state information from the relay device to the server;

G. determining whether the server receives the state information;

if so, establishing a corresponding relation between the state information and the at least one control command in the server;

otherwise, repeating step F and step G;

wherein, in step D, the at least one control command is transmitted from the relay device to the at least one home appliance for at least two times; a first interval is defined as a time interval between time points when the at least one control command is sent out for a first time and for a second time; in step E, the state information is transmitted from the at least one home appliance to the relay device; a second interval is defined as a time interval between time points which the state information is sent out for a first time and a second time; the second interval is different from the first interval.

12. The method of claim 11, wherein, in step D, the first interval is randomly decided.

13. The method of claim 12, wherein, in step D, the first interval comprises a first waiting time and a first random time; the first random time is randomly decided.

14. The method of claim 11, wherein, in step E, the second interval is randomly decided.

15. The method of claim 14, wherein, in step E, the second interval comprises a second waiting time and a second random time; the second random time is randomly decided.

16. The method of claim 14, wherein the at least one home appliance comprises a plurality of home appliances; in step A, the at least one control command corresponds to more than one of the home appliances; in step D, the at least one control command is sent to the corresponding home appliances; each of said home appliances generates the corresponding state information after performing the corresponding operation; in step E, the state information is transmitted from each of said corresponding home appliances to the relay device for at least two times.

* * * * *